US010192567B1

(12) United States Patent
Kamdar et al.

(10) Patent No.: US 10,192,567 B1
(45) Date of Patent: Jan. 29, 2019

(54) ECHO CANCELLATION AND SUPPRESSION IN ELECTRONIC DEVICE

(71) Applicant: MOTOROLA MOBILITY LLC, Chicago, IL (US)

(72) Inventors: Pratik M. Kamdar, Naperville, IL (US); Jincheng Wu, Naperville, IL (US); Joel A. Clark, Woodridge, IL (US); Malay Gupta, South Elgin, IL (US); Plamen A. Ivanov, Schaumburg, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/921,555

(22) Filed: Mar. 14, 2018

Related U.S. Application Data

(60) Provisional application No. 62/574,187, filed on Oct. 18, 2017.

(51) Int. Cl.

| | |
|---|---|
| ***H04R 3/00*** | (2006.01) |
| ***G10L 21/02*** | (2013.01) |
| ***H04B 3/20*** | (2006.01) |
| ***G10L 21/0232*** | (2013.01) |
| ***G10L 25/84*** | (2013.01) |
| ***G10L 25/21*** | (2013.01) |

(Continued)

(52) U.S. Cl.
CPC ...... *G10L 21/0232* (2013.01); *G10L 21/0272* (2013.01); *G10L 21/0316* (2013.01); *G10L 25/21* (2013.01); *G10L 25/84* (2013.01); *G10L 2021/02082* (2013.01)

(58) Field of Classification Search
CPC .. H04R 3/00; H04R 3/02; H04R 3/005; G10L 21/02; G10L 21/0232; G10L 21/0316; G10L 21/0272; G10L 21/0208; G10L 2021/02082; G10L 25/21; G10L 25/84; G10K 11/178; G10K 2210/505; H04B 3/20; H04B 3/23; H04M 3/002; H04M 9/082
See application file for complete search history.

(56) References Cited

U.S. PATENT DOCUMENTS 5,463,618 A * 10/1995 Furukawa .............. H04B 3/234 370/290
6,442,274 B1 * 8/2002 Sugiyama ................ H04B 3/23 379/406.01

(Continued)

*Primary Examiner* — Thang V Tran
(74) *Attorney, Agent, or Firm* — Yudell Isidore PLLC

(57) ABSTRACT

A portable device performs echo cancellation and echo suppression. An audio echo signal and an audio desired signal are obtained from an acoustic echo correction stage of the portable device. The echo and desired signals are converted to the frequency domain. Frequency bin results of the respective frequency domain converted echo and desired signals are grouped into echo and desired sub-bands. A sub-band suppressor gain is estimated based on the estimated sub-band energy for the echo and desired sub-bands. The frequency domain converted echo signal is modulated based at least in part on the estimated sub-band suppressor gain to compensate for residual echo. The compensated frequency domain converted echo signal is time domain converted into an audio output signal. The audio output signal is processed by a selected one of a voice recognition engine and a communication module transmitter.

11 Claims, 13 Drawing Sheets

(51) Int. Cl.

| | |
|---|---|
| ***G10L 21/0316*** | (2013.01) |
| ***G10L 21/0272*** | (2013.01) |
| *G10L 21/0208* | (2013.01) |

(56) References Cited

U.S. PATENT DOCUMENTS

| | | | | |
|---|---|---|---|---|
| 2003/0053617 | A1* | 3/2003 | Diethorn | H04M 9/082<br>379/406.01 |
| 2006/0098808 | A1* | 5/2006 | Marchok | G10L 15/30<br>379/406.02 |
| 2008/0101622 | A1* | 5/2008 | Sugiyama | H04R 3/04<br>381/66 |
| 2009/0310796 | A1* | 12/2009 | Seydoux | H04M 9/082<br>381/71.1 |
| 2010/0135483 | A1* | 6/2010 | Mohammad | H04M 9/082<br>379/406.08 |
| 2011/0019832 | A1* | 1/2011 | Itou | H04R 3/02<br>381/66 |
| 2011/0124380 | A1* | 5/2011 | Wang | H04M 9/082<br>455/570 |
| 2011/0135105 | A1* | 6/2011 | Yano | H04B 3/235<br>381/66 |
| 2013/0156210 | A1* | 6/2013 | Shaw | G10K 11/16<br>381/66 |
| 2013/0301840 | A1* | 11/2013 | Yemdji | H04M 9/082<br>381/66 |
| 2014/0334620 | A1* | 11/2014 | Yemdji | H04R 3/02<br>379/406.08 |

* cited by examiner

ECHO CANCELLATION AND SUPPRESSION IN ELECTRONIC DEVICE

CLAIM OF PRIORITY

This application claims the benefit of priority under 35 U.S.C. § 119(e) to U.S. Provisional Application Ser. No. 62/574,187 entitled "ECHO CANCELLATION AND SUPPRESSION IN PORTABLE DEVICE," filed Oct. 18, 2017, the contents of which are incorporated herein by reference in their entirety.

BACKGROUND

1. Technical Field

The present disclosure relates generally to electronic devices with audio speakers and microphones, and more particularly to electronic devices that incorporate acoustic echo cancellation.

2. Description of the Related Art

Audio playback systems of electronic devices are increasingly designed to produce high sound pressure output levels. In contrast to earpiece audio output levels for traditional handheld phone usage, these high sound pressure levels are sufficient to be used as a primary method of consuming multimedia content and for hands free communication. In addition, microphone sensitivity and an audio gain lineup for received audio is chosen such that the electronic device can be voice controlled from a distance of a meter or even multiple meters. The sensitivity and gain are configured to compensate for source-to-microphone path loss, which can exceed 20 dB. With loud playback and sensitive microphones in the same device, an echo cancellation system is often incorporated into the electronic devices. The demands to the echo control system in such electronic device can approach or in some case exceed those imposed on stationary teleconferencing systems. For example, unlike stationary teleconferencing systems which, once installed are calibrated for the specific acoustic conditions of a particular placement in a room. By contrast, the electronic devices are generally used in continually changing locations, and thus have to operate under unknown echo return conditions.

In voice recognition driven user devices with closely-spaced loudspeaker and microphone system, a large raw echo from the loudspeaker will be picked up by the microphone. The conventional way to cancel the echo is to use an adaptive filtering (AF)-based acoustic echo canceler (AEC). The conventional AEC models the acoustic path between loudspeaker output and microphone input with a linear filter and subtracts the echo replica from the microphone input signal. Using this conventional AEC, the best attenuation achieved is about 25 dB-30 dB if the system is linear and is operating with echo path magnitude and phase being static or varying very slowly. However, a portable or mobile loudspeaker and microphone system is more often positioned in an environment, where the relative positions of the electronic device, reflecting structures, and users are changing. In addition, system non-linearity introduced by the transducers, by vibrations in the body of the device and by other factors, can render the conventional AEC inadequate. The problem is made more acute for small electronic devices, such as speakerphones, which produce high sound pressure levels while incorporating voice control. The effects caused by nonlinearity and vibrations cannot be modeled completely by linear adaptive filters and thus conventional AEC cannot remove all of the echo. This residual echo from conventional AEC is a non-stationary noise-like signal correlated to and bearing the same characteristics as the downlink signal. This residual echo can be very disruptive when mixed in with user speech as an input to a voice recognition (VR) engine. Consequently, the speech of a user often cannot be recognized or can be mis-recognized by the VR engine. The residual echo presents challenges in voice communications too, as it reduces call quality and can give rise to user complaints.

In an attempt to address the deficiencies of linear modeling for echo cancelation, another conventional way to further reduce residual echo is to use a nonlinear processor (NLP) based on a voice activity detection (VAD) signal. NLP that is processed in the time domain tends to be very complicated and cannot be accurate, resulting in attenuating a user's speech. The NLP method is effective in reducing echoes for a downlink single talker case when a near-end talker is silent; however, the NLP method cannot reduce residual echo from mixed speech. In addition, the NLP method cannot improve the echo-to-speech ratio (ESR). Thus, the recognition accuracy of the VR engine will not be increased. Moreover, recognition accuracy may even be decreased because of reduced overall level of mixed speech and residual echo in the time domain NLP. Another clear drawback is that a delay between the residual echo and loudspeaker signal is unknown. Real-time changes occur in the echo path. The spectrum for both residual echo and loudspeaker signal cannot be precisely aligned. Therefore, the frequency dependent information such as attenuation gain will not be accurate.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
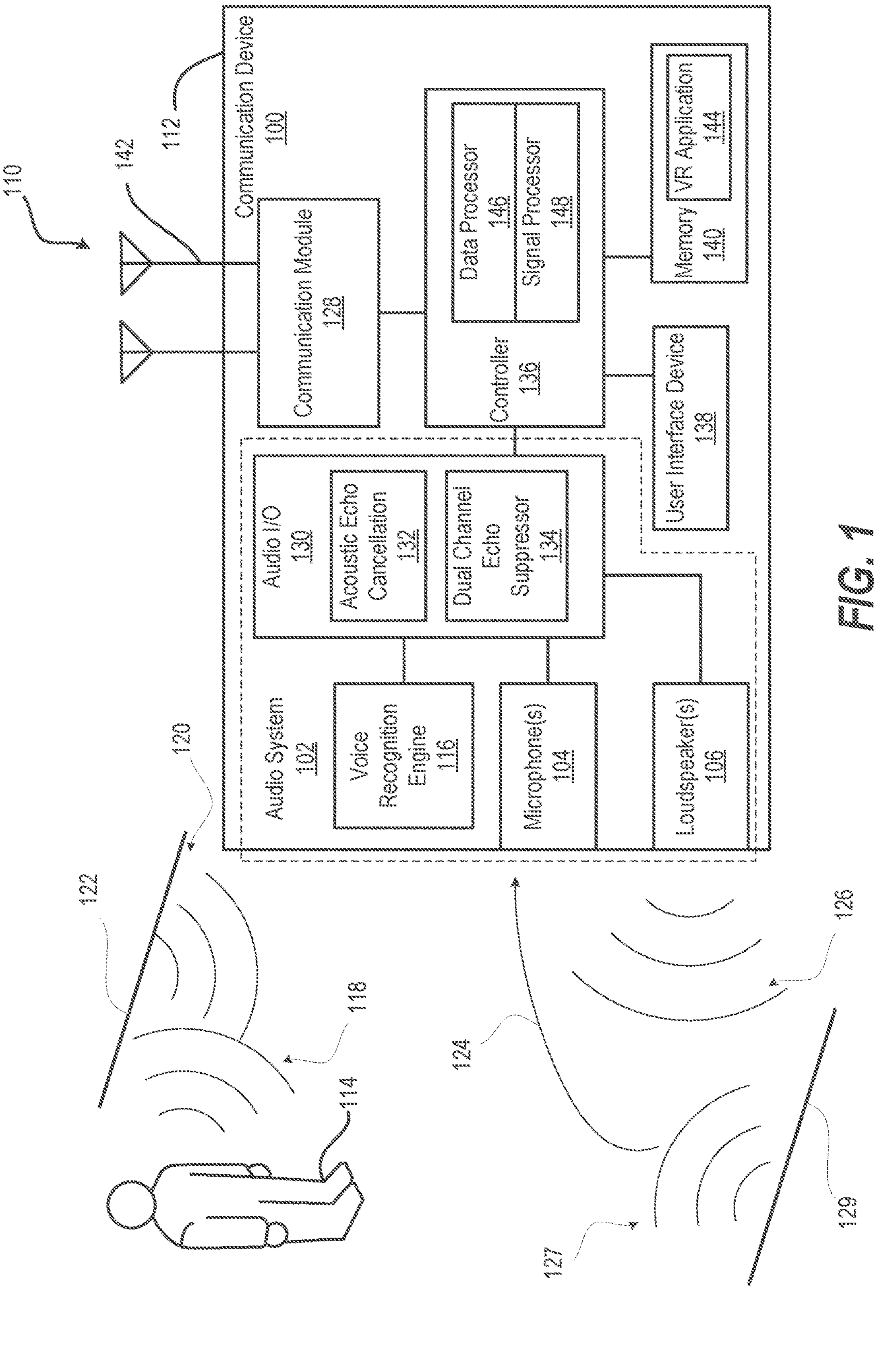
FIG. 1 illustrates a functional block diagram of an example electronic communication device within which certain of the functional aspects of the described embodiments may be implemented.

Electronic devices employ multiple speakers in order to reproduce multi-channel audio content, such as multimedia, video playback, in various formats, such as: stereo, 5.1, or other multi-speaker formats. Each speaker or playback channel couples to each of the microphones on the device via a unique echo path. The echo path is not known in advance and tends to vary with time as changes occurs in the relative placement of the electronic device to sources of echoes. Each echo-path provides energy contribution into an uplink signal sent to the automated speech recognition (ASR) system or to a transmission part of the electronic device. This echo path requires compensation. A unique adaptive filter (AF) loop is needed in order to model one echo path, resulting in M×N loops, for a system of M microphones, and N speakers. According to aspects of the present innovation, an electronic device configured for audio signal processing and playback performs echo cancellation and echo suppression.

According to another aspect of the invention, the illustrative embodiments of the present disclosure provide a method and user equipment (UE) that reduces residual echo with a dual channel residual echo suppressor after acoustic echo cancellation (AEC). The dual channel residual echo suppressor suppresses residual echo while maintaining user speech so that an echo-to-speech ratio (ESR) of a user will be increased. With improved ESR, recognition accuracy of a voice recognition (VR) engine will be greatly increased. Application of the dual channel residual echo suppressor can be made in any voice communication device or systems with a large echo that is caused either by the acoustic components or other electrical leakage. Suppressing the large echo improves the communication duplexity and voice quality of a "double talk" case. Double-talk refers to a situation in which both the near-end user and speaker on the device are active, i.e. both speaker and user are "talking".

In one or more embodiments, a method includes performing dual channel echo cancellation followed by performing dual channel echo suppression. The cancellation is often not sufficient for large echo situations, necessitating further suppression. In one or more embodiments, the method includes receiving a first reference signal from a first channel based on an audio playback component of an electronic device configured for audio signal processing and playback. The method includes receiving an echo signal from a second channel based on a microphone signal of the electronic device. The first reference signal is adaptively filtered. The adaptively filtered first reference signal is subtracted from the echo signal to create an error signal. The method includes calculating the adaptive filter weights, using the least mean square (LMS) or similar algorithm. The method includes performing dual channel echo suppression of the adaptively filtered reference signal by: detecting spectral energy in the adaptively filtered reference signal and the error signal; calculating echo-to-speech ratio (ESR) of the spectral energy; and adjusting spectral gain of the error signal based on the ESR to generate a first output signal. LMS filtering thus refers to an entire construct of an adaptive filter, an unknown system and LMS weights calculation. The samples of the error signal are used in calculating the weights/coefficients of the adaptive filter, according to the least mean square or other algorithms. This LMS filter does not directly modify the error signal itself, which is what the term "filtering" generally implies. LMS filtering is performed in an indirect way. The LMS filter adapts the weights of the adaptive filter, which operates on the reference signal, in such a way, that the error between the microphone signal and filtered reference is minimized. Minimization of the error signal results in the adaptive filter tracking and approximating (modelling) the echo path. As a result, the reference signal is modified such that the reference signal is very similar to the echo signal produced by the microphone In one or more embodiments, an electronic device is provided that includes an audio playback subsystem comprising a first speaker, a first microphone, and an echo cancellation and echo suppression (ECES) system. The ECES system is communicatively coupled to the audio playback subsystem and the first microphone. The ECES system operates in two functional stages that can be supported by separate components or provided within an integrated platform. The ECES system includes a dual channel echo cancellation stage that removes some echo and includes a residual echo suppression stage that subsequently removes more of the echo. The dual channel echo cancellation stage includes an adaptive filter that receives a first reference signal from a first channel based on an audio playback component of the electronic device and that receives an echo signal from a second channel based on a microphone signal of the electronic device. The echo cancellation stage includes an adaptive filter, the weights of which are calculated using the LMS (or similar) algorithm. The echo cancellation stage also includes a subtraction component that produces an error signal e(n) as provided by Equation 1.

$$e(n)=m(n)-f*r(n) \quad \text{Equation 1.}$$

The subtraction component subtracts an adaptively filtered first reference signal received from the adaptive filter from an echo signal received from the first microphone to generate an error signal. In particular, error signal e(n) is formed by subtracting adaptively filtered (f) reference signal r(n) from the microphone signal m(n) which contains near end speech and echo. The adaptive filter (f) is convolved with the reference signal r(n) to perform the frequency filtering, wherein "*" denotes convolution. The least mean squares or similar algorithm, is used to calculate the weights of the adaptive filter, such that the error signal is minimized.

The dual channel echo suppression (DCES) stage receives the adaptively filtered first reference signal and the error signal. The DCES stage detects spectral energy in the adaptively filtered reference signal and the error signal. The DCES stage calculates echo-to-speech ratio (ESR) of the spectral energy. Based on the ESR, the DCES stage adjusts spectral gain of the error signal to output a first output signal.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Turning now to FIG. 1, there is depicted a block diagram representation of an example communication device 100 having an audio system 102 with microphone(s) 104 and loudspeaker(s) 106 and within which several of the features of the disclosure can be implemented. In one or more embodiments, communication device 100 incorporates wireless communication capabilities to operate as a wireless communication device. Communication device 100 is also presented as an electronic communication device, although the features of the disclosure are equally applicable to a stationary communication device. Communication device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, communication device 100 can be one of a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless or wired communication functions as part of a communication system 110. Communication device 100 can also be an over-the-air link in communication system 110 that can be intended to be portable or hand-held or for which a user can move into close proximity. Examples of such communication devices include a wireless modem, an access point, a repeater, a wirelessly-enabled kiosk or appliance, a femtocell, a small coverage area node, and a wireless sensor, etc.

Microphone(s) 104 and loudspeaker(s) 106 can be closely positioned within a device enclosure 112. A near user 114, who may be several meters away from communication device 100, can interact with and control via a voice recognition (VR) engine 116. However, a primary voice path 118 from near user 114 can be mixed with an echo voice path 120 that has a time varying delay and magnitude. For example, user 114 may move relative to communication device 100 and a reflective surface 122, changing the geometry of the acoustic path and thus the magnitude and phase of the echo. Audio interference 124 can also include one or more reflections 127 from surface(s) 129. In addition, audio interference 124 can be caused by a loudspeaker output 126 from loudspeaker(s) 106. Due to the proximity and volume from loudspeaker(s) 106, audio interference 124 can present a much stronger echo than an echo from near user 114.

The audio interference can prevent successful interpretation of spoken word by VR engine 116. The audio interference can also degrade the fidelity of spoken words picked up by microphone(s) 104 that is transmitted by a communication module 128, reducing user experience. In order to provide a sufficient audio quality level for VR engine 116 and/or communication module 128, an audio input/output (I/O) subsystem 130 can perform echo cancellation. In one or more embodiments, an AEC132 can attenuate some of the echo. For example, AEC component 132 attenuates a predictable amount of audio interference 124 that is created by communication device 100. However, due to the proximity between loudspeaker(s) 106 and microphone 104, and the large signal levels needed in playback, AEC component 132 may not provide sufficient attenuation. According with aspects of the present disclosure, additional compensation is provided by dual channel echo suppressor (DCES) 134.

Communication device 100 can include a controller 136, a user interface device 138, a memory 140, and one or more antennas 142 for transceiving via communication module 128. Communication device 100 can include a VR application 144 resident in memory 140. VR application 144 can be executed by a data processor 146 and/or signal processor 148. VR application 144 can depend upon recognition achieved by VR engine 116.

In one or more embodiments, AEC component 132 provides an audio echo signal and an audio desired signal. The echo signal and desired signal are converted to the frequency domain in frequency bins by DCES 134. A frequency bin is a grouping of adjacent frequency spectra. DCES 134 groups frequency bin results of the respective frequency domain converted echo and desired signals into echo and desired sub-bands. In signal processing, sub-band coding (SBC) is any form of transform coding that breaks a signal into a number of different frequency bands, typically by using a fast Fourier transform, and encodes each one independently. This decomposition is often the first step in data compression for audio and video signals. A sub-band suppressor gain is estimated based on the estimated sub-band energy for the echo and desired sub-bands. The frequency domain converted echo signal is modulated based at least in part on the estimated sub-band suppressor gain to compensate for residual echo. The compensated frequency domain converted echo signal is time domain converted into an audio output signal. VR application 144 processes the audio output signal into textual speech. A communication module transmitter processes the audio output signal into transmitted quality audio.

Figure 2:
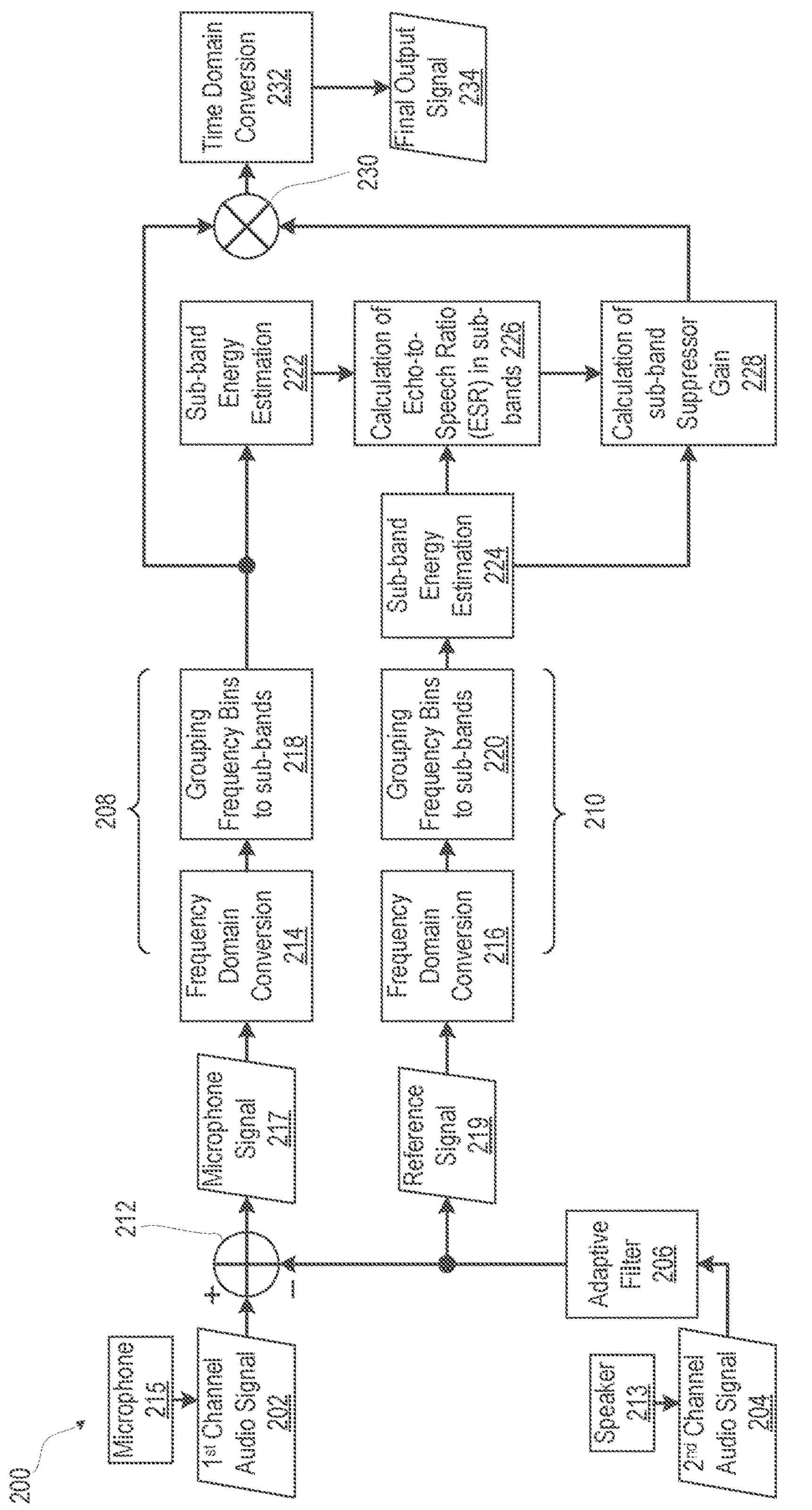
FIG. 2 illustrates a functional block diagram of an example dual channel echo suppressor of an electronic device, according to one or more embodiments.

FIG. 2 illustrates a functional block diagram of an example dual channel echo suppressor of an electronic device, according to one or more embodiments. FIG. 2 illustrates a DCES 200 that can be implemented on portable communication device 100 having one microphone 104 and loudspeaker 106 (FIG. 1). Thus, further attenuation of an echo is performed based on first and second channel audio signals 202, 204. In the illustrative embodiment, DCES 200 uses the already available signals from an adaptive filter (AF) 206 that characterizes second channel audio signal 204 as inputs so no additional computation is needed. One of the inputs, which is the direct output of the AEC, is called an error signal. The other signal is the direct output from least mean squares (LMS) based AF within AEC. The dual channels, referred to as two inputs, are called speech channel 208 and echo channel 210, respectively. Speech channel 208 has either residual echo or user's speech or the mix of both, the latter indicated by summation block 212. AF 206 receives an input from the error signal in order to operate. The residual echo is a result of the incomplete cancellation of the echo signal. The residual echo is modelled by AF 206 acting on second audio channel signal 204 from speaker 213, when subtracted from first audio channel signal 202 from microphone 215 in summation block 212. Echo channel 210 has only pure duplicated or mimicked echo signal matched to the input raw echo to AEC 132 (FIG. 1). The impulse response of AF 206 approximates and tracks the changes modeling the echo path from a speaker 213 to a microphone 215. the time-alignment of both speech channel signal and echo channel signal are automatically adjusted by AF 206.

Two input channel signals 202, 204, from microphone 215 and speaker 213, respectively, are thus used in the time domain to produce a microphone signal 217 and a reference signal 219 respectively out of summation block 212 and AF 206. Microphone signal 217 and reference signals 219 are converted to frequency domain signals respectively by frequency domain conversion blocks 214 and 216. The resulting frequency domain signals are grouped and combined in frequency bins into certain number of frequency bands, called sub-bands, in grouping frequency bins to sub-bands blocks 218 and 220. The respective signals carried on speech and echo channels 208, 210 are then further processed in sub-band energy estimation blocks 222, 224 respectively to calculate an estimate of the energy of each of the sub-bands. The sub-band energy estimates from both channels 208, 210 are transmitted to calculation of echo-to-speech ratio (ESR) in sub-band block 226. For each sub-band, the ESR is calculated based on the sub-band energy for echo and speech signal. In calculation of sub-band suppressor gain block 228, the residual echo attenuation gain for each sub-band is computed based on the echo and speech energy of each sub-band as well as the corresponding sub-band ESR between two channels 208, 210.

In one example, the reference echo signal can be smaller than a pre-defined threshold. Thus, residual echo is smaller than expected from a conventional AEC output. This is determined in calculation of sub-band suppressor gain block 228, based on the energy estimates provided from sub-band energy estimation block 224. The energy estimates from sub-band energy estimation block 224 measure the energy in the reference signal 219, calculated for each of the sub-bands, after grouping the frequency bins (obtained from frequency domain conversion block 216) is done in grouping frequency bins to sub-bands block 220. In response, the gain is set to be a small and consistent residual echo attenuation gain as pre-defined for low bound limit. Such consistent gain is set for each sub-band, by the gain calculation block 228. In another example, the reference echo signal is bigger than the pre-defined threshold. This is again determined for each of the sub-bands, by the logic in the calculation of sub-band suppressor gain block 228, with the information provided from sub-band energy estimation block 224. DCES 200 determines that the energy of the reference echo channel to speech channel ratio (ESR) is larger and above the pre-defined threshold. In response to the ESR being larger and above the pre-defined threshold, a larger residual echo attenuation gain is calculated and set inside calculation of sub-band suppressor gain block 228, based on the sub-band ESR values provided by calculation of ESR in sub-bands block 226, for each of the sub-bands. With this mechanism, when a user's speech is present, an ESR will be decreased and so will the residual echo attenuation gain. With no user speech in the residual echo only, the ESR will be increased; therefore, the residual echo attenuation gain will be bigger but is limited to a pre-defined maximum number. This limiting of the residual attenuation gain avoids a large change in the residual echo attenuation gain for the frequency domain. Large changes in the residual echo attenuation gain for the frequency domain typically cause speech distortion in time domain. The relation between ESR and residual echo attenuation gain can be effectively approximated as a linear relationship contained in a lookup table or algebraic formula.

In multiplier block 230, the calculated sub-band gains are used to modulate the bins in each of the sub-bands from block 218; the residual echo attenuation gain for each sub-band can be applied to the corresponding speech channel so that the residual echo spectrum of each sub-band in speech channel is attenuated or subtracted from the speech channel. Then, the modulated output of the modified spectrum of speech channel signal is converted back to the time domain in time-domain conversion block 232 to produce a final output signal 234.

DCES 200 does not require voice activity detection (VAD), which substantially reduces the complexity and computation load for communication device 100. The reduction in hardware can enable smaller and less expensive portable devices. The reduction in computational load saves the power and thus increases battery service life. Without the VAD being needed, the DCES can still consistently reduce or suppress the residual echo. This improvement is achieved not only in the example of double talk, but also for the example a loudspeaker signal within a pre-defined maximum attenuation range. In an example of user speech only case, there is no impact due to residual echo suppression since the echo reference is zero. The sub-band gain is 0 db or close to 0 dB which means no modification is applied to the speech channel for user speech.

Figure 3:
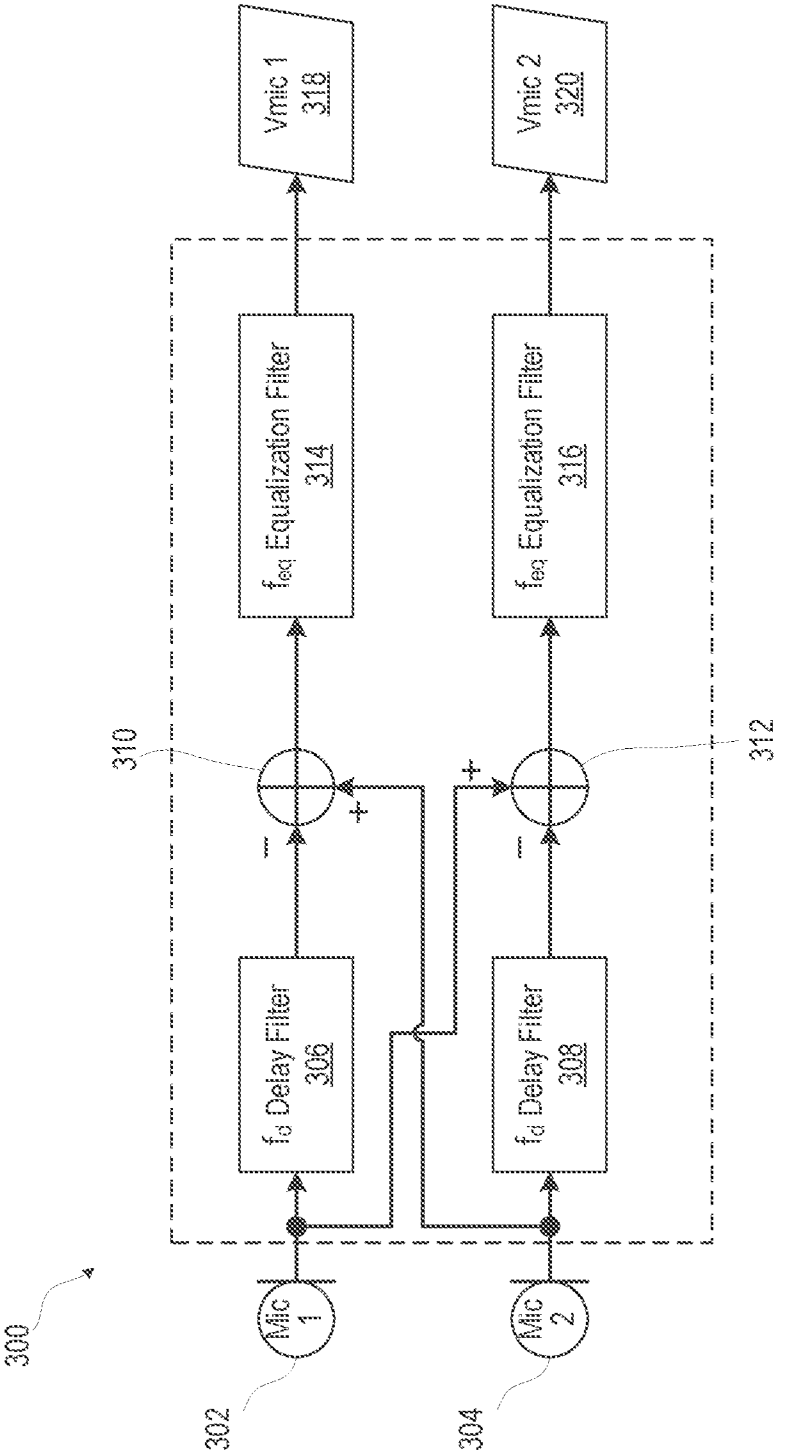
FIG. 3 illustrates a functional block diagram of a multiple microphone combiner of an electronic device, according to one or more embodiments.

Principles of the present disclosure can be implemented on electronic devices with multiple microphones. A microphone signal can be the signal from an individual sensor, or can be a virtual microphone signal, which is the composite signal, obtained from combining the outputs of multiple sensors/microphones according to various algorithms. One such algorithm can be differential microphone array processing 300, which is illustrated in FIG. 3, and is often done with the intent to obtain a signal with desirable spatial characteristics and orientation. FIG. 3 illustrates a functional block diagram of a multiple microphone combiner of an electronic device, according to one or more embodiments. FIG. 3 illustrates the combination of two microphones, "Mic 1" 302 and "Mic 2" 304 done by either hardware (for example physical hardware implemented in "Microphone (s)" 104 (FIG. 1), or by software, or a combination of both, as part of the audio I/O subsystem block 130 illustrated in FIG. 1. The combination of the two microphones is done by appropriately delaying, one signal with respect to the other in respective frequency delay filter blocks 306, 308 prior to subtraction in a respective summing junction 310, 312. The outputs from each of summing junction 310, 312 are passed to respective equalization filters 314, 316 for spectral compensation of the resulting signals, virtual microphone 1 ("Vmic 1") 318 and virtual microphone 2 ("Vmic 2") 320. Other forms of beam forming by the electronic device can be employed for the same purpose. This allows dividing space into sectors, and providing multiple processing branches to an automatic speech recognition (ASR) system.

Figure 4:
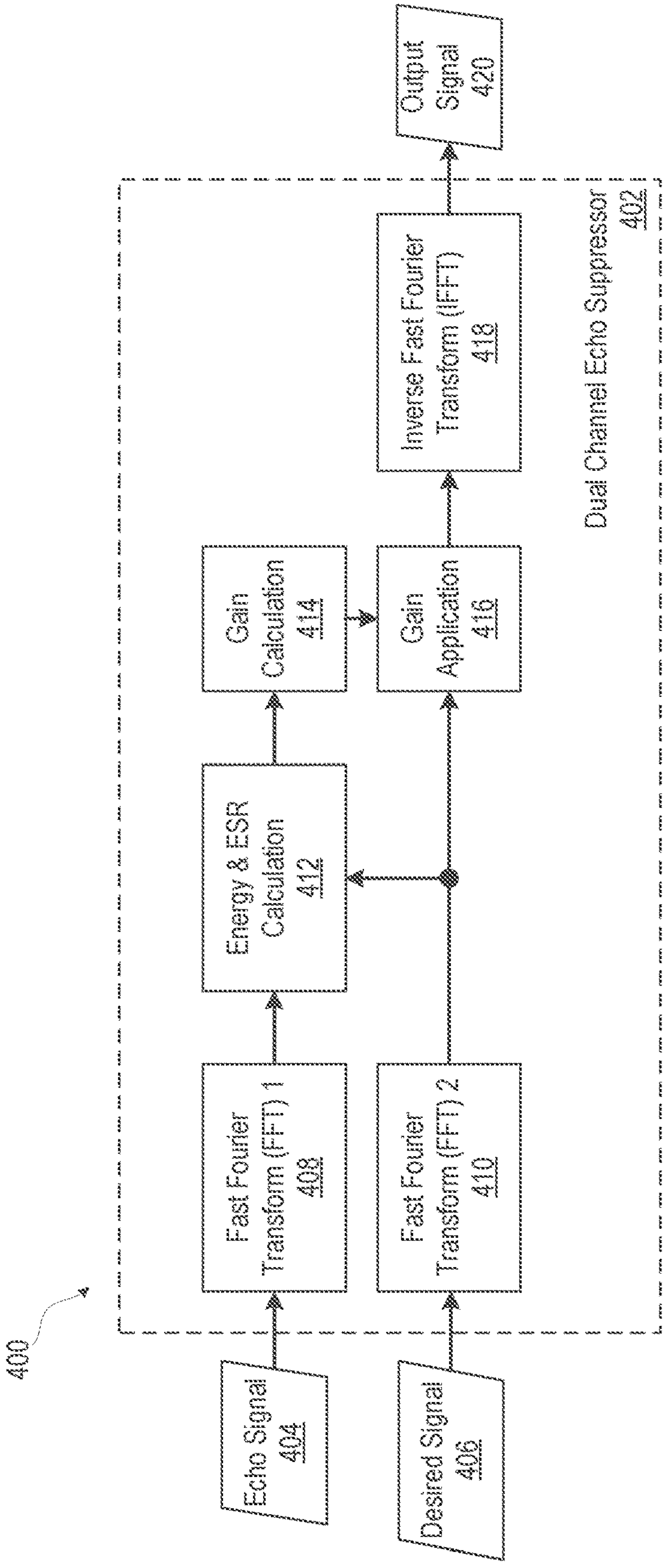
FIG. 4 illustrates a functional block diagram of an example dual channel echo suppressor that performs energy and echo-to-speech ratio (ESR) calculation in the frequency domain, according to one or more embodiments.

FIG. 4 illustrates a functional block diagram of an example dual channel echo suppressor that performs energy and ESR calculation in the frequency domain, according to one or more embodiments. FIG. 4 illustrates an electronic device 400 having DCES 402 that operates on an echo signal 404 and a desired signal 406. Echo and desired signals 404, 406 are each converted to the frequency domain respectively by Fast Fourier Transform (FFT) 1 408 and FFT 2 410. The frequency resolution of the conversion defines frequency bins. The frequency domain results are processed by energy and ESR calculation module 412 for the calculation of energy and ESR. Results of energy and ESR calculation module 412 are used for gain calculation in gain calculation block 414 which controls a gain application in gain application block 416 of the frequency domain version of the desired signal 406. An inverse fast Fourier transform (IFFT) in IFFT block 418 provides a time domain output signal 420. Thus, as illustrated in FIG. 4, DCES 402 can operate without grouping the individual frequency bins into sub-bands. Grouping into sub-bands minimizes artifacts; however, other such methods can be employed for the same purpose. For example, smoothing the gains, either as a function of frequency or as a function of time, can be accomplished by use of the gain calculation function. The energy calculation can be obtained as a function in time for each frequency bin.

Figure 5:
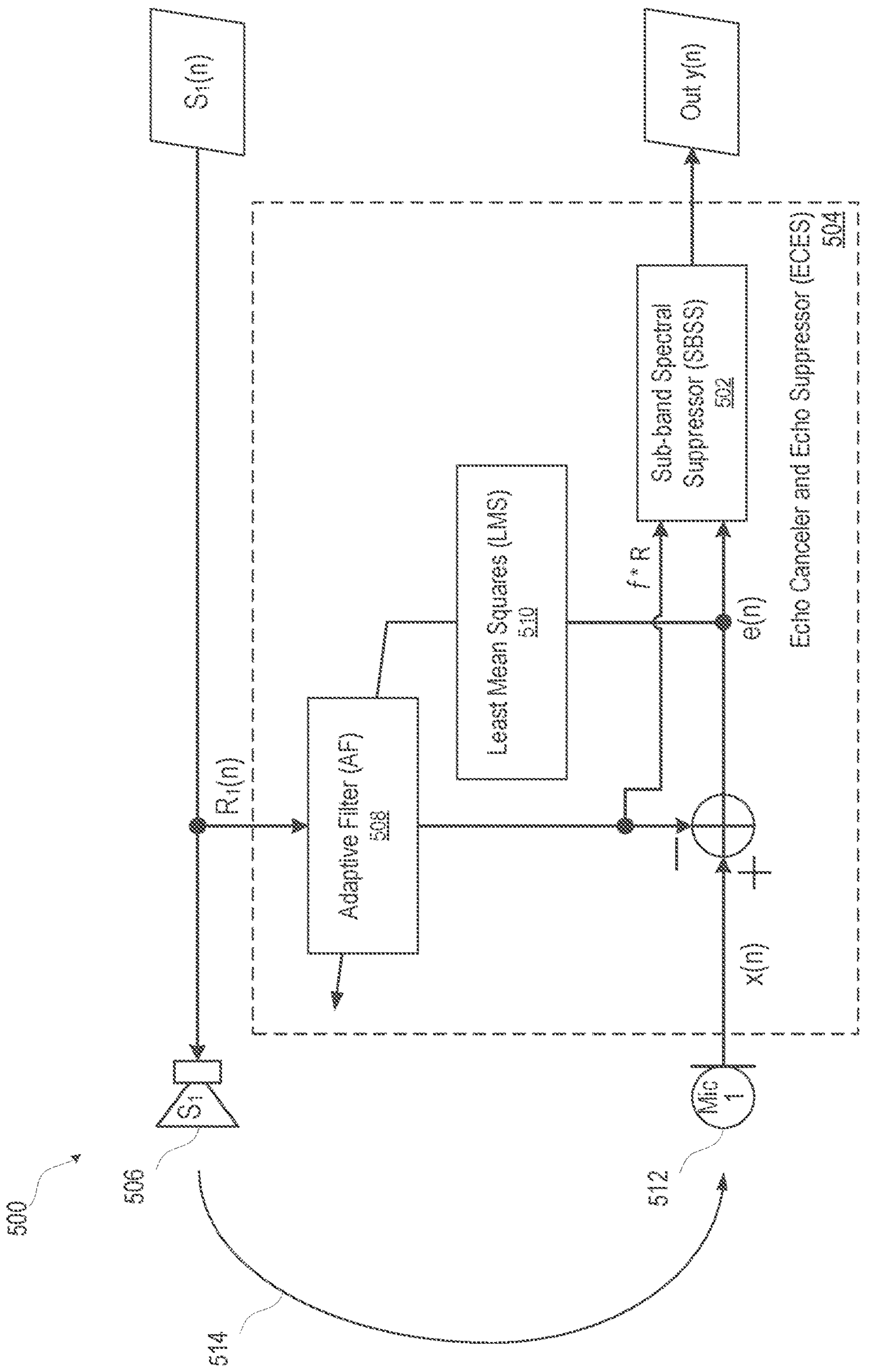
FIG. 5 illustrates a functional block diagram of an example echo canceler and echo suppressor (ECES) of an electronic device, according to one or more embodiments.

FIG. 5 illustrates a functional block diagram of an example echo canceler and echo suppressor (ECES) of an electronic device, according to one or more embodiments. System 500 of FIG. 5 utilizes a sub-band spectral suppressor (SBSS) 502 implemented as one "atomic" (i.e. "indivisible") operation that performs adaptive filtering and the subsequent spectral enhancement as part of an echo canceler and echo suppressor (ECES) component 504. In the illustrated embodiment, each speaker signal $S_1(n)$ from a speaker ("$S_1$") 506, referred to as a reference signal, is fed into an adaptive filter (AF) 508 as signal $R_1(n)$. The weights of AF 508 are adjusted according to the known least mean squares (LMS) 510 (or other methods of adaptation), based on an error signal (e(n)) obtained as a difference between the microphone signal (Mic 1) from microphone 512 and the output of the AF 508. AF 508 can be realized as a finite impulse response (FIR), or infinite impulse response (IIR), or AF 508 can be implemented entirely in the frequency domain. One such instance of AF 508 is needed for each speaker. Similarly, one such instance of an AF 508 is needed for each microphone. The spatial relationship between respective speakers and microphones can be modeled as a known delay of an ideal audio signal that was sent to the respective speaker for broadcast to be picked up by a respective microphone. The permutations of predicted echoes at the determined delays are canceled at least to a degree by AF 508. The filtered speaker signal (f*R) and the error signal (e(n)) are passed as inputs to SBSS 502 to reduce residual echo in an output signal y(n). Filtered speaker signal (f*R) is the convolution "*" of the filter impulse response "f" and reference signal "R".

Figure 6:
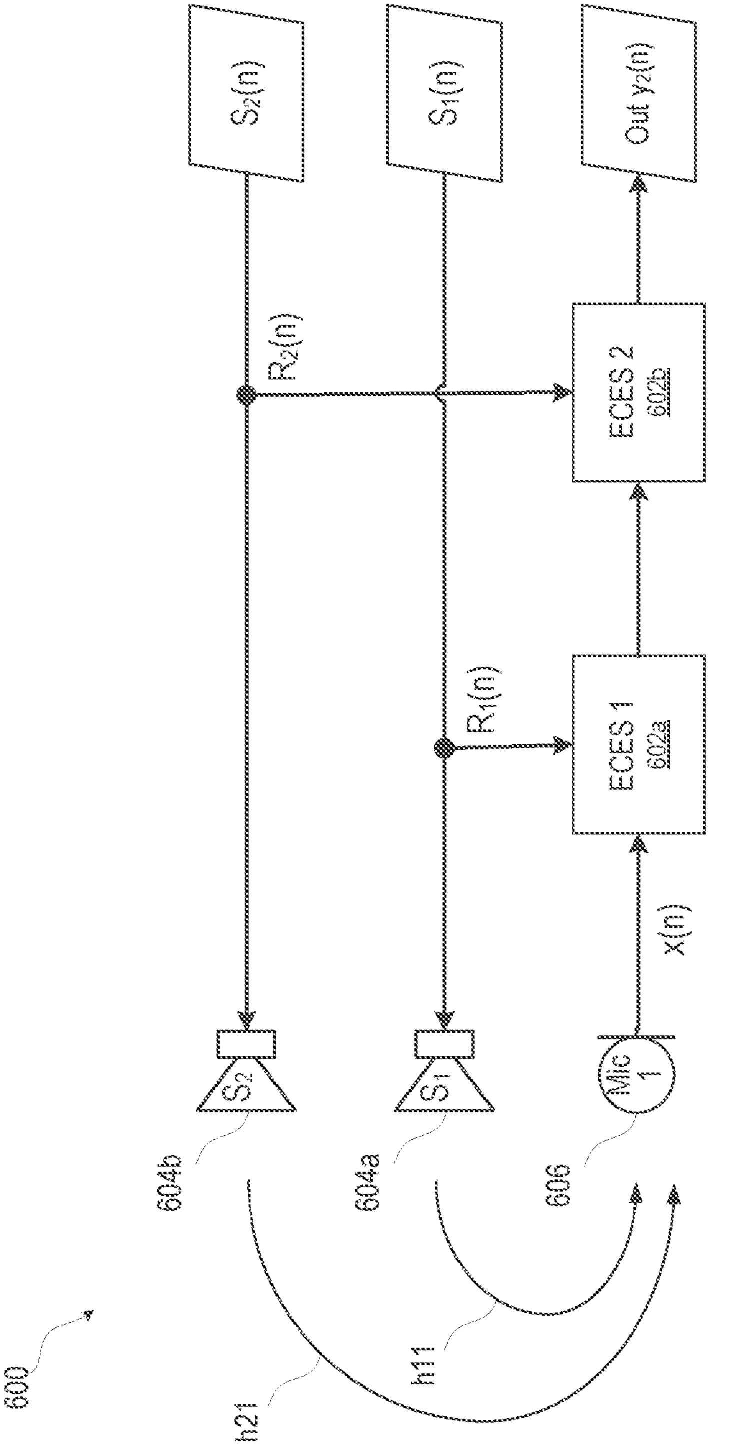
FIG. 6 illustrates a functional block diagram of an example ECES of an electronic device that sequentially suppresses residual echo based on reference signals from two audio playback speakers, according to one or more embodiments.

FIG. 6 illustrates a functional block diagram of an example ECES of an electronic device that sequentially suppresses residual echo based on reference signals from two audio playback speakers, according to one or more embodiments. When multiple speaker echo loops are compensated for, the output of each echo suppressor serves as the input to the next AF filter stage. Adaptation of each of the loops of AF filters can be done according to an adjoined algorithm, or individually. This sequence is illustrated in system 600 of FIG. 6 as cascaded ECES 1 and 2 blocks 602*a*, 602*b*. Electronic device produces a first speaker signal $S_1(n)$ that energizes a first speaker $S_1$ 604*a*. First speaker $S_1$ 604*a* energized by first speaker signal $S_1(n)$ produces echo along path h11. Electronic device transmits a reference signal $R_1(n)$ to ECES 1 602*a* along with signal x(n) from microphone 1 606. Electronic device produces second speaker signal $S_2(n)$ that is transmitted to a second speaker $S_2$ 604*b*. Second speaker $S_2$ 604*b* energized by second speaker signal $S_2(n)$ produces echo along path h21. Electronic device transmits a reference signal $S_2(n)$ to ECES 2 602*b* along with a resultant signal from ECES 1 602*a* to produce output signal $y_2(n)$.

Herein, a reference signal can be a signal which is processed, for example filtered and down-sampled, in order to match the sampling rate and corresponding signal bandwidth of the microphone processing system to that of the playback system. For example, playback may employ signals of higher bandwidth, sampled at higher rate, than that used to sample the microphone signals. For example, a playback may have a sampling rate of 48 kHz. Microphone signals can be sampled and are processed at a lower 16 kHz rate. The reference signal can be filtered and down-sampled from the playback rate of 24 kHz to match the 16 kHz of the microphone signals so that the reference and error signals have the same sampling frequency.

Figure 7:
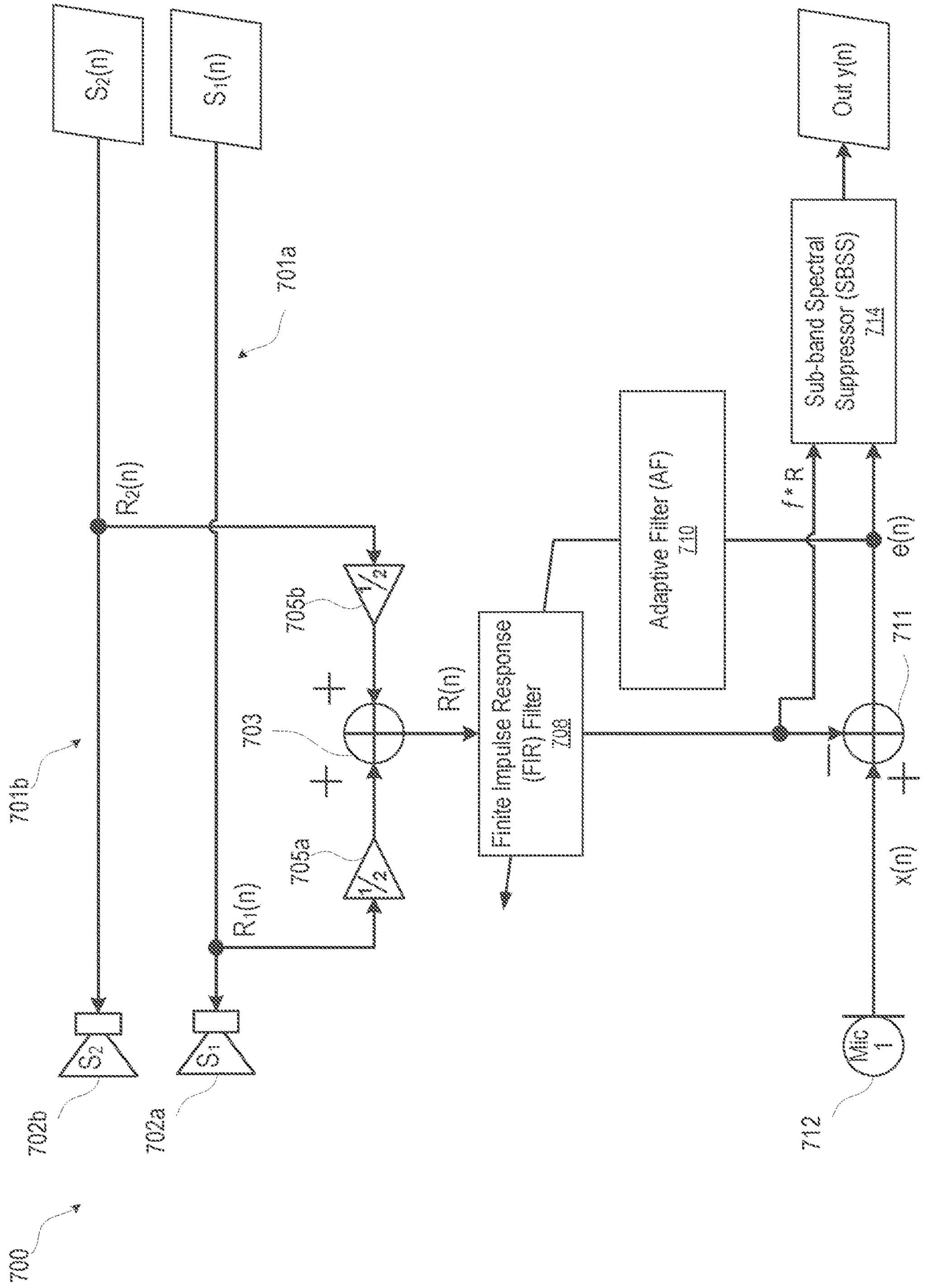
FIG. 7 illustrates a functional block diagram of an example ECES of an electronic device that suppresses residual echo based on using combined reference signals from two audio playback speakers, according to one or more embodiments.

FIG. 7 illustrates a functional block diagram of an example ECES of an electronic device that suppresses residual echo based on using combined reference signals from two audio playback speakers, according to one or more embodiments. DCES system 700 includes two playback channels 701*a*, 701*b* of speaker $S_1$ 702*a* and speaker $S_2$ 702*b*, respectively. Playback channel 701*a* of speaker $S_1$ 702*a* is driven by first speaker signal $S_1(n)$, and playback channel 701*b* of speaker $S_2$ 702*b* is driven by second speaker signal $S_2(n)$. For clarity, only two playback channels 701*a*, 701*b* of two speakers 702*a*, 702*b* are illustrated; however, more channels can be included, in other embodiments. After attenuation by half power amplifiers 705*a*, 705*b*, respectively, the reference signals $R_1(n)$, $S_2(n)$ from each channel 701*a*, 701*b* are combined with a mixer 703, providing the reference signal $R=(\frac{1}{2})*R_1+(\frac{1}{2})*R_2$ that is fed into an AF 708 as signal R(n). The weights of AF 708 are adjusted according to the known LMS 710 (or other methods of adaptation), based on an error signal (e(n)) obtained as a difference at summation block 711 between the microphone signal (Mic 1) from microphone 712, and the output of AF 708. The filtered speaker signal (f*R), where "*" denotes convolution operation of the filter f and reference signal R, and the error signal (e(n)) are passed as inputs to SBSS 714 to reduce residual echo in an output signal y(n).

FIG. 7 illustrates a two channel system; however, the number of channels can vary according to what number of playback channels are employed, and what weights are applied as respective gain values to the individual output channels. SBSS 714 processes the filtered speaker signal f*R and the error signal e(n). This embodiment provides a simplified architecture, suitable for implementation on devices with limited processing power, or when the two or multiple speakers are playing the same signal. Such simplified architectures can be incapable of supporting multiple adaptive filter echo cancellation loops. Limiting the cancellation loops reduces the resulting echo return loss enhancement (ERLE). ERLE is the ratio of send-in power to the power of a residual error signal (e(n)) immediately after cancellation. This limited architecture that achieves less echo cancellation thus allows for the ERLE to be significantly increased by the spectral suppressor. The increase is due to the fact that the filter output as a function of the dual microphone combined echo path contains sufficient information for the suppressor to calculate sub-band gains for processing of the AF error signal e(n).

Figure 8:
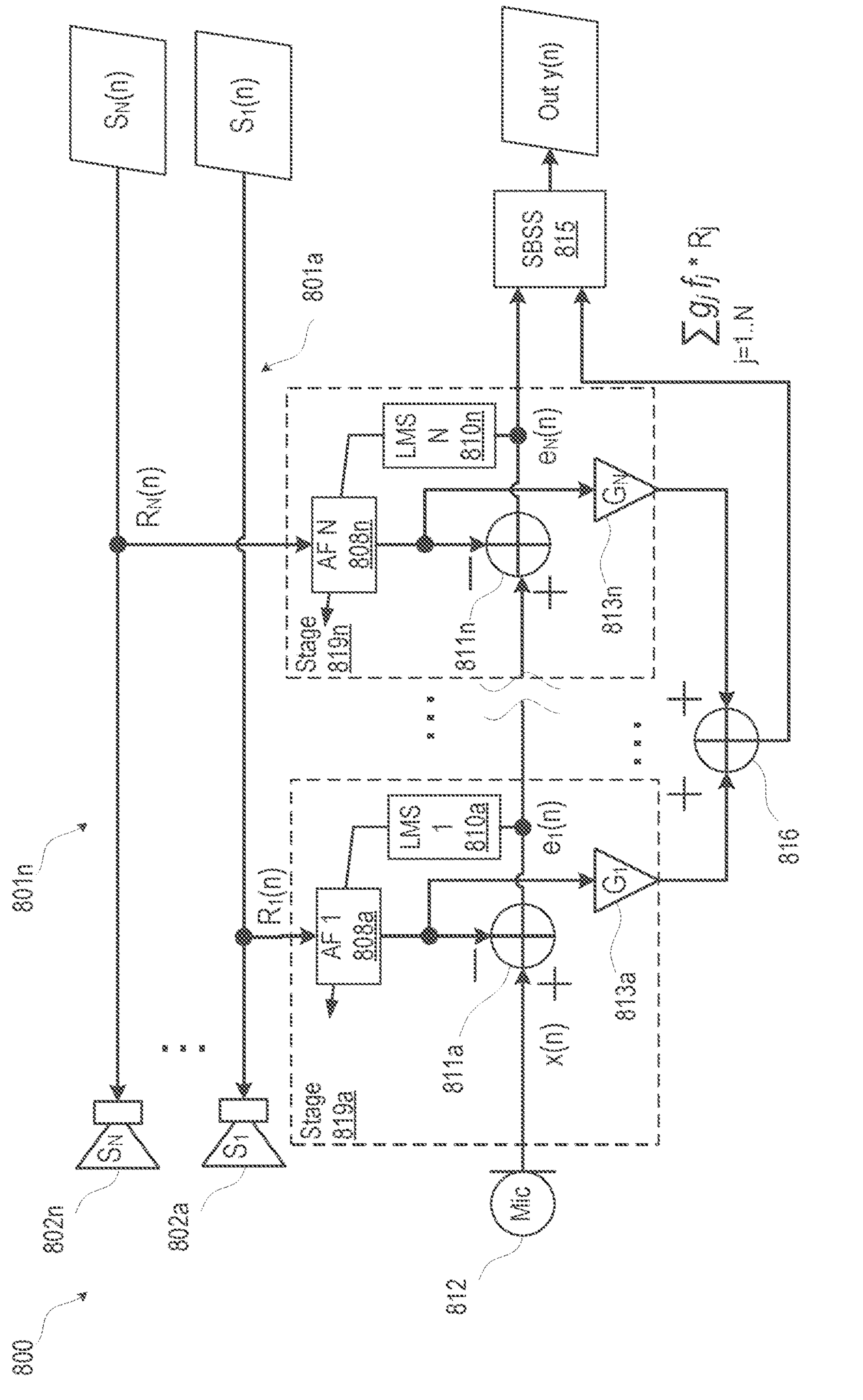
FIG. 8 illustrates a functional block diagram of an example ECES of an electronic device that sequentially suppresses residual echo based on multiple reference signals and per stage gain stages from corresponding audio playback speakers, according to one or more embodiments.

FIG. 8 illustrates a functional block diagram of an example DCES system 800 of an electronic device that sequentially suppresses residual echo based on multiple reference signals and per stage gain stages from corresponding audio playback speakers, according to one or more embodiments. DCES system 800 includes multiple channels 1 to N 801*a*, 801*n* where each channel 801*a*, 801*n* includes a first speaker $S_1$ 802*a* and an $n^{th}$ speaker $S_N$ 802*n* that are respectively driven by speaker signals $S_1(n)$ to $S_N(n)$. Reference signal $R_1(n)$ from first channel 801*a* is processed by an AF 808*a* according to LMS 810*a*. Reference signal $R_N(n)$ from the $n^{th}$ channel 801*n* is processed by an AF 808*n* according to LMS 810*n*. An error signal $e_n(n)$ is obtained as a difference between any previous stages 819*a*, such as the microphone signal associated with microphone 812 (Mic 1), and the output of a later stage 819*n* of AF 808*n*. The reference signals from each of individual playback channels 801*a*, 801*n* are fed into their respective AF 808*a*, 808*n*. The adaptation of the AFs 808*a*, 808*n* is done by either an adjoined algorithm or is done independently of one another. Here, "adaptation" refers to the process of calculating and changing the weights of an adaptive filter (AF), according to the LMS (or other such algorithm). In the adjoined algorithm, the weights of both filters are adjusted based on the final error signal. In the case of independent adaptation, the weights are adjusted based on the error signals obtained following each summing junction 811*a*, 811*n*. The final error output of last summing junction 811*n* forms the desired signal input to SBSS 815, while the echo signal input is formed as a linear combination at summation junction 816 of the outputs of all AFs 808*a*, 808*n* at a respective gain $G_1$-GN 813*a* and 813*n*. The benefits of this embodiment compared to the previous embodiments are that the individual AF loops can be trained to better track the transfer functions describing the respective echo return paths from the playback channels to microphone 812.

Figure 9:
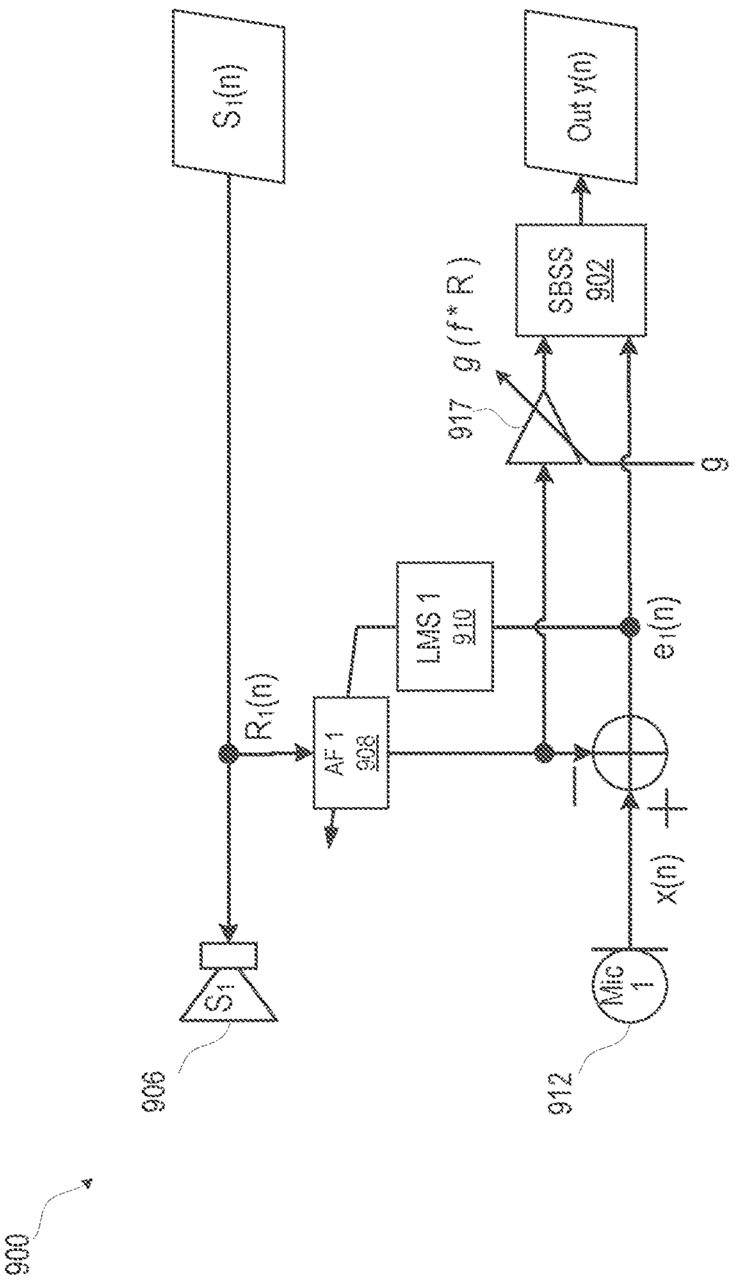
FIG. 9 illustrates a functional block diagram of an example ECES of an electronic device that variably suppresses residual echo, according to one or more embodiments.
Figure 10:
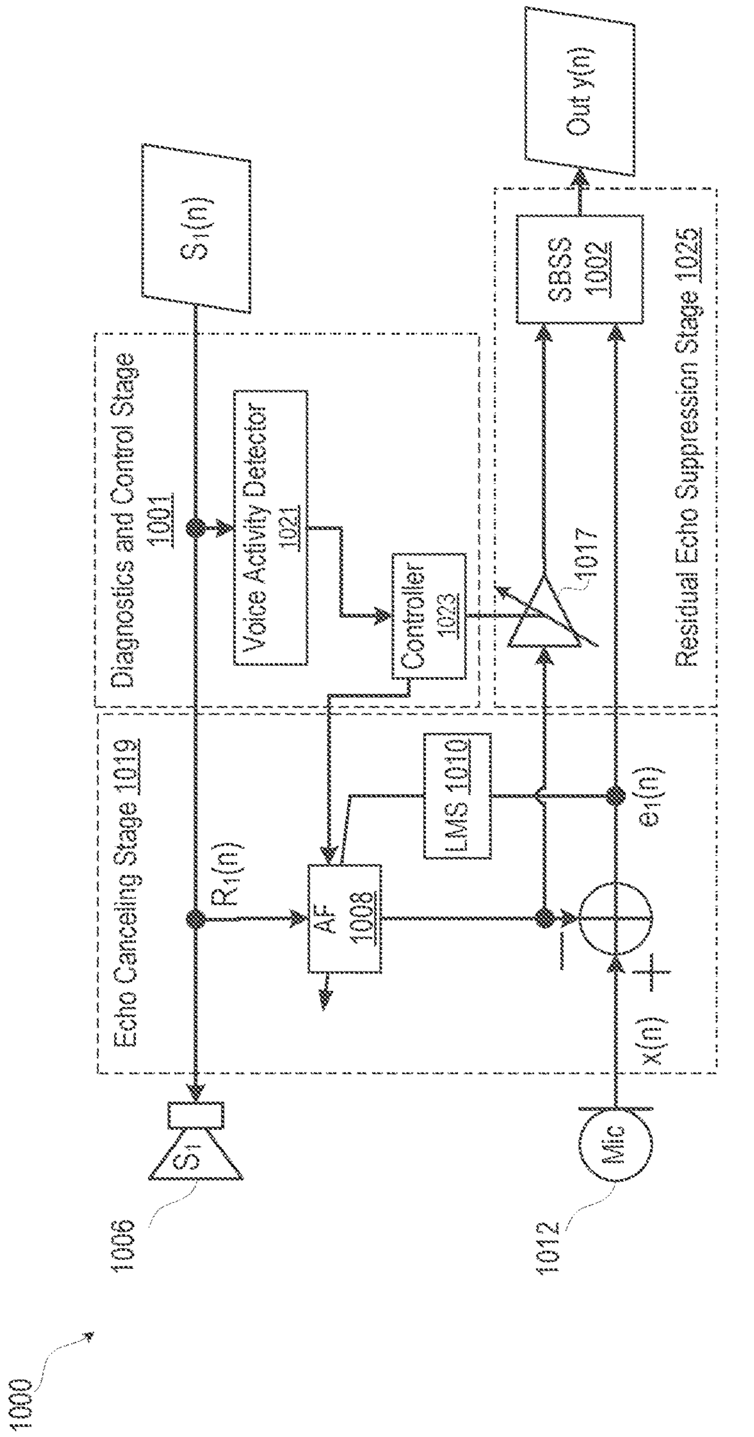
FIG. 10 illustrates a functional block diagram of an example ECES of an electronic device that has a diagnostic and control stage that enables an echo suppression stage, according to one or more embodiments.

FIGS. 9-10 illustrate ECESs 900, 1000 respectively having diagnostics and control of the echo compensation system. The sub-band suppressor calculates various gains for each sub-band. The gains are based on the ratio of desired input signal energy to undesired input signal energy. According to the present disclosure the ratio of desired to undesired signal can be based on the echo to speech ratio. Higher attenuation is almost always achieved at the expense of higher level of artifacts in the speech signal post-processing. In some instances, balancing the amount of residual signal, and allowing higher residual can be selected to guarantee lower level of artifacts in the near-end speech. Such can be the case of some automated speech recognition (ASR) systems that tolerate noise-like residual, but are sensitive to drastic changes in the speech characteristics. In other cases, it may be necessary to remove more of the echo, and tolerate some speech artifacts. Minimizing the echo may be more important to a human recipient during transmission for a satisfactory user experience.

FIG. 9 illustrates a functional block diagram of an example ECES 900 of electronic device 100 that variably suppresses residual echo, according to one or more embodiments. ECES 900 utilizes a SBSS 902 to perform adaptive filtering and the subsequent spectral enhancement. Each speaker signal $S_1(n)$ from a speaker $S_1$ 906 is fed into an AF 908 as reference signal $R_1(n)$. The weights of the AF 908 are adjusted according to the known LMS 910, based on an error signal (e(n)) obtained as a difference between the microphone signal (Mic 1) from microphone 912 and the output signal of AF 908. An amount of echo reduction provided by SBSS 902 is controlled by varying the echo input signal level via a variable gain stage 917. ECES 900 can reduce the level of the signal, which results in a corresponding change to the ESR calculated in the SBSS 902. Thus, ECES 900 can controllably adjust an amount of additional suppression by controlling the level of the signal to SBSS 902. ECES 900 can increase this signal level to prompt a more aggressive action on part of the SBSS 902. Another way to control the amount of suppression would be to vary the rules for gain calculation, by substituting the pre-calculated table values, or by changing the formula according to which the gains are calculated as a function of ESR. The gain can be applied in a pre-determined way. In one example, a detected use case can trigger a gain setting, such as being in call mode or in trigger monitoring mode. Variable gain stage 917 can be a function of an output gain applied to the playback part of the apparatus. Variable gain stage 917 can be interpreted as a frequency dependent gain that varies according to frequency if control in a specific part of the monitored signal spectrum is desired.

FIG. 10 illustrates a functional block diagram of an example ECES 1000 of an electronic device that has a diagnostic and control stage that enables an echo suppression stage, according to one or more embodiments. ECES 1000 includes an additional diagnostics and control stage 1001. SBSS 1002 performs spectral enhancement following the echo cancellation performed by 1019. Each speaker signal $S_1(n)$ from a speaker $S_1$ 1006 is transmitted to an AF 1008 as reference signal $R_1(n)$. The weights of AF 1008 are adjusted according to known LMS 1010, based on an error signal (e(n)) obtained as a difference between the microphone signal (x(n)) from microphone (Mic) 1012 and the output of AF 1008. An amount of echo reduction provided by SBSS 1002 is controlled by varying the echo input signal level via a variable gain stage 1017. In some embodiments, the echo conditions vary; therefore, it may be desirable to monitor the output of echo canceling stage 1019 of the apparatus. Based on a detected amount of residual echo from the echo canceling stage 1019, diagnostic and control stage 1001 can control SBSS 1002 for a correspondingly appropriate amount of echo suppression to employ. For example, when the residual echo signal at the output of an echo cancelling stage 1019 is within the predetermined limit that would not affect the operation of the ASR system in trigger monitoring mode; the diagnostic and control stage 1001 can bypass echo suppression processing by SBSS 1002. A voice activity detector 1021 produces a VAD signal that enables a controller 1023 to control AF 1008 and variable gain stage 1017. As a result, lower current drain occurs due to savings in the signal processing. In addition, lag in system response time is reduced, which in a frame-based SBSS 1002 can result in measurable savings. Another benefit of this diagnostic and control stage 1001 is providing the ability to detect when echo conditions are below a predetermined threshold that is indicative that the subsequent processing will not provide enough enhancement. Diagnostic and control stage 1001 can determine that insufficient enhancement will result in a high probability of poor ASR decision making on this microphone branch of the system. To avoid a false result in decision making, diagnostic and control stage 1001 can remove the processing branch altogether of SBSS 1002 and ASR. This selective control function is beneficial in a multi-microphone system, where the various sensors are employed to provide multiple paths for individual instances of the ASR system. Multiple paths can maximize the likelihood of a trigger phrase or command recognition. Multiple paths can also be useful in cases when space is divided and individual sectors are monitored.

The control algorithm can be based on monitoring the residual echo level, during downlink single-talk case when down-link signal is present and the near end signal is absent. The near-end signal statistics can be monitored. When the short-term statistics are equal to their long term statistics, near-end signal is considered absent. Such statistics can be calculated in the absence of a downlink signal. Absence of a downlink signal can be indicated from the monitored reference. Detected levels of speech in downlink and uplink during an active call can be dynamically used to set the monitored reference. Such statistics can be calculated in the presence of the downlink signal, such as for example during music playback. Statistics of interest may include signal energy, rate of change of the signal envelope, VAD or others.

Another aspect of this monitoring and control algorithm is making a decision on the optimal AF loop architecture, based on the playback content. In the case of two-speaker electronic devices, capable of reproducing stereo content, in one or more embodiments the architecture illustrated in FIG. 8 can be preferable to the architecture illustrated in FIG. 7. A decision on the optimal architecture can be made by monitoring the degree to which the two channels are "different". In dual-channel mono content (where the signal in the left and right channels is the same, or approximately the same, for example, when the difference signal is below a pre-defined threshold), the apparatus can be switched to the architecture as shown in FIG. 7. Conversely, when the content is detected as not having dual-channel mono content, in one or more embodiments the optimal architecture of FIG. 8 can be selected for multiple AF loops. The difference in content can be obtained by monitoring either the statistics of the signal or can be a decision based on metadata provided with the signals.

Figure 11A:
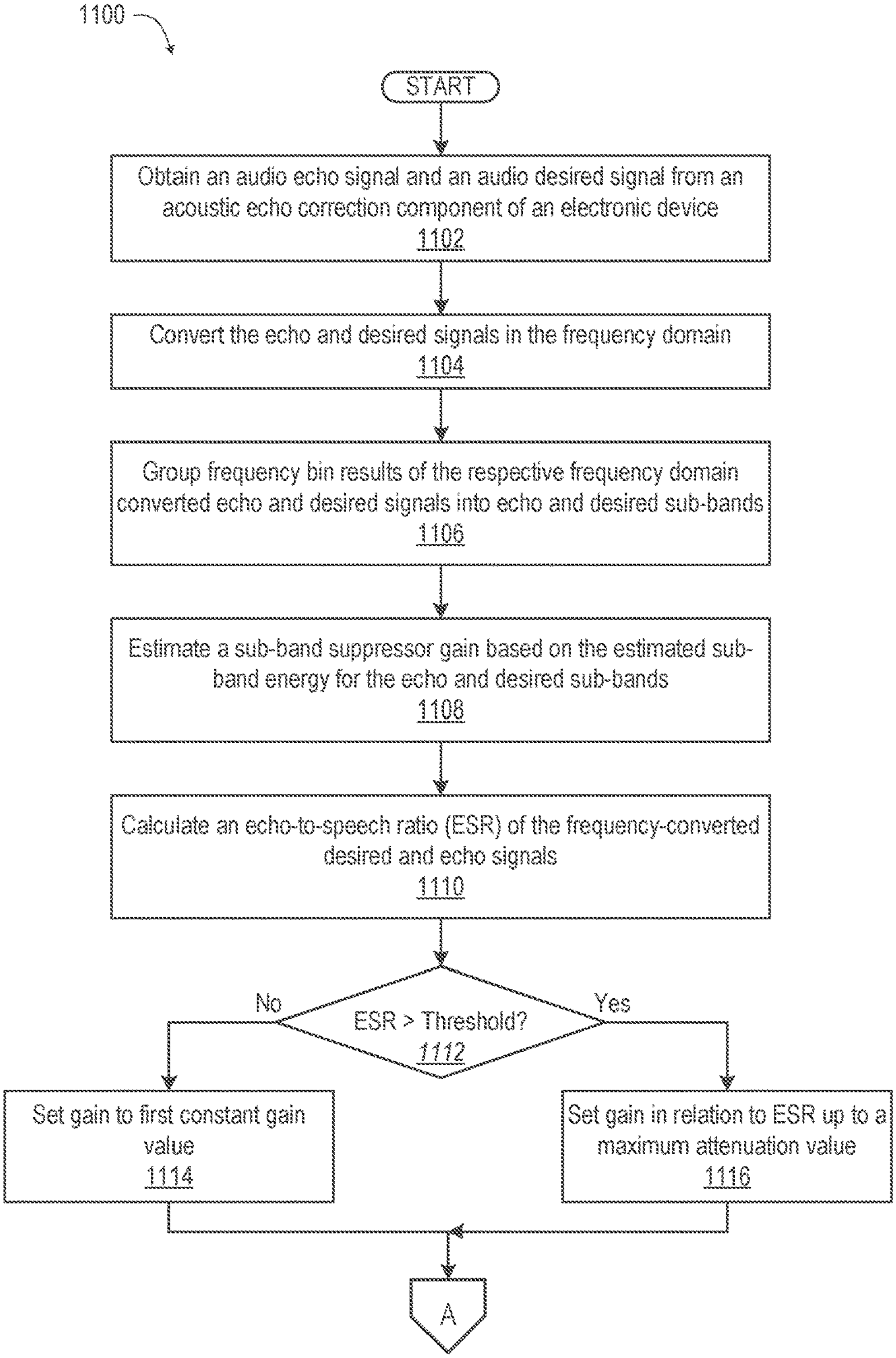
FIGS. 11A-11B illustrate a flow chart of a method of frequency-domain suppressing an echo following echo cancellation in a dual channel electronic device, according to one or more embodiments.
Figure 11B:
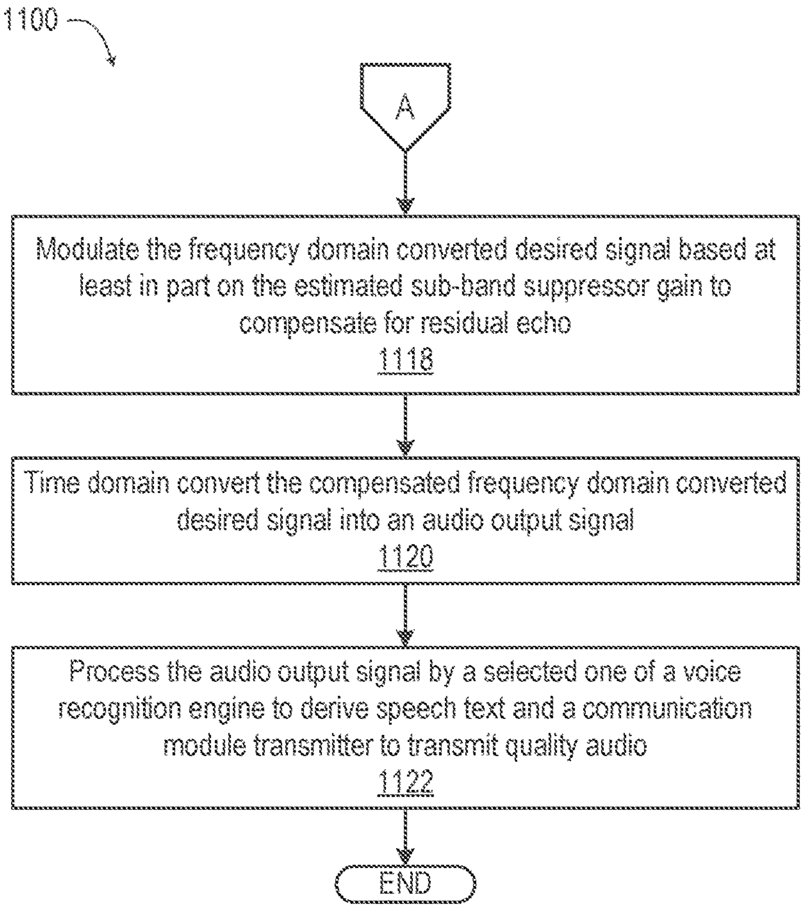

In one or more embodiments, FIGS. 11A-11B illustrate a method 1100 of frequency-domain suppressing an echo following echo cancellation in a dual channel electronic device. Method 1100 begins with a processor obtaining an audio echo signal and an audio desired signal from an acoustic echo correction stage of an electronic device (block 1102). A processor converts the echo and desired signals in the frequency domain (block 1104). Method 1100 includes grouping into echo and desired sub-bands the frequency bin results of the respective frequency domain converted echo and desired signals (block 1106). Method 1100 includes estimating a sub-band suppressor gain based on the estimated sub-band energy for the echo and desired sub-bands (block 1108).

In one or more embodiments, method 1100 further includes calculating an echo-to-speech ratio (ESR) of the frequency-converted desired and echo signals (block 1110). A determination is made whether the ESR≥threshold (decision block 1112). In response to determining that the ESR is not above the threshold, the gain is set for a first constant gain value (block 1114). In response to determining that the ESR is at or above the threshold, method 1100 includes setting the gain in relation to the ESR up to a maximum attenuation value (block 1116).

After setting the gain in either block 1114 or block 1116, the frequency domain converted desired signal is modulated based at least in part on the estimated sub-band suppressor gain to compensate for residual echo (block 1118). Method 1100 includes time domain converting the compensated frequency domain converted desired signal into an audio output signal (block 1120). Method 1100 includes processing the audio output signal by a selected one of a voice recognition engine to derive speech text and a communication module transmitter to transmit quality audio (block 1122). Then method 1100 ends.

Figure 12:
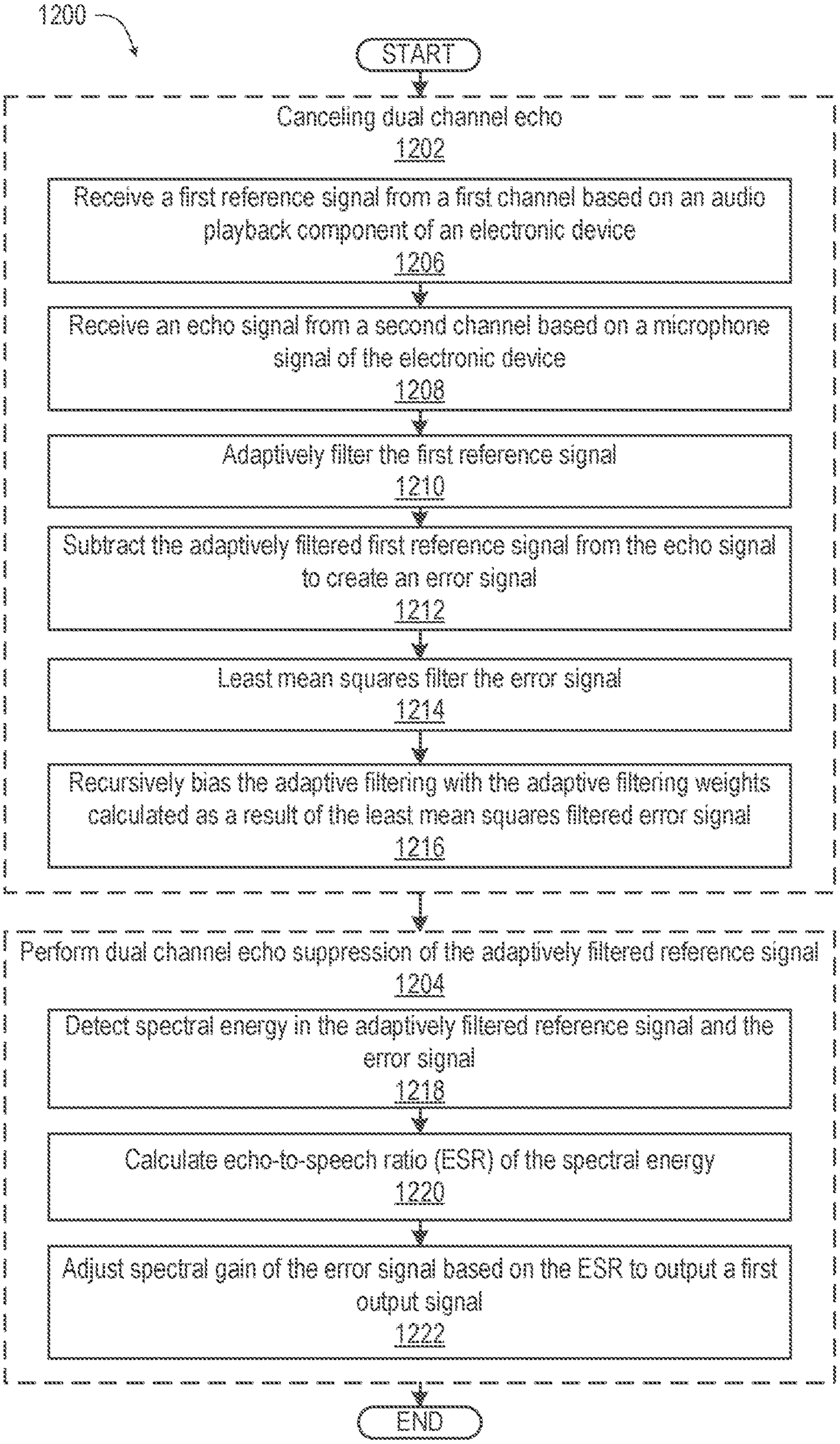
FIG. 12 illustrates a flow chart of a method of reducing large echoes by a sub-band spectral suppressor after residual echo cancellation, according to one or more embodiments.

FIG. 12 illustrates a method 1200 for reducing large echoes by a sub-band spectral suppressor after residual echo cancellation. Method 1200 begins canceling dual channel echo to produce an adaptively filtered reference signal (block 1202). Method 1200 includes performing dual channel echo suppression of the adaptively filtered reference signal to produce an output signal (block 1204). In one or more embodiments, canceling dual channel echo of block 1202 comprises: (i) A processor receives a first reference signal from a first channel based on an audio playback component of an electronic device (block 1206). (ii) A processor receives an echo signal from a second channel based on a microphone signal of the electronic device (block 1208). (iii) Method 1200 includes processor adaptively filtering the first reference signal (block 1210). (iv) Processor subtracts the adaptively filtered first reference signal from the echo signal to create an error signal (block 1212). (v) Method 1100 includes processor least mean squares filters the error signal (block 1214). (vi) Processor recursively biases the adaptive filtering with the adaptive filtering weights calculated as a result of the least mean squares filtered error signal (block 1216).

Performing dual channel echo suppression of the adaptively filtered reference signal of block 1204 comprises: (i) Detecting spectral energy in the adaptively filtered reference signal and the error signal (block 1218). (ii) Method 1200 includes calculating echo-to-speech ratio (ESR) of the spectral energy (block 1220). (iii) Method 1200 includes adjusting spectral gain of the error signal based on the ESR to output a first output signal (block 1222). Then method 1200 ends.

In one or more embodiments, method 1200 further includes receiving more than one reference signal. Then, method 1200 includes combining the more than one reference signal into a first reference signal. In one or more embodiments, method 1200 further includes receiving a second reference signal and performing dual channel echo cancellation on the second reference signal and the first output signal to generate a second error signal. The first error signal is modulated by a first gain and the second error signal is modulated by a second gain. Method 1200 includes: combining the modulated first and second error signals to produce the adaptively filtered reference signal; and performing the dual channel echo suppression of the adaptively filtered reference signal based on the second error signal.

In one or more embodiments, method 1200 includes selecting a gain level for a variable gain stage. The adaptively filtered reference signal is modulated according to the selected gain level in the variable gain stage. Method 1200 includes performing the dual channel echo suppression on the modulated adaptively filtered reference signal. In one or more embodiments, method 1200 further includes: detecting voice activity based on the reference signal; and performing the dual channel echo suppression in response to detecting voice activity.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

The rate of adaptation of the AF loops can be controlled. While the sub-band suppressor is intended to operate in the absence of any VAD information, a VAD signal can be derived elsewhere in the system, and employed to control the rate of AF adaptation. In practice, VAD information can be useful to speed up the adaptation in the absence of near-end talker. VAD information can be used to slow down adaptation in the detected presence of such near-end talker. VAD information can be useful in stopping AF adaptation in the absence of playback signal to avoid divergence of the AF weights from their optimal value. This along with other details, such as number of loops, filter sizes, etc., are implementation dependent and present no limitations with respect to the described system or algorithm.

In the figures used throughout this disclosure, the sub-band suppressor is described as operating in the frequency domain, via a time-domain to frequency domain transformation, such as FFT, short-time Fourier transform (STFT), discrete cosign transform (DCT) or other transformation matrix. However, it should be appreciated that the specific implementations described are provided for illustrative purposes only. A sub-band suppressor can be built entirely in the time domain, by first processing the input through an analysis filter bank, which outputs band-limited signals in the time domain. Energy calculation for echo and speech signals, the ESR, and the resulting gain factors can then be obtained from these time-domain representations. Gains in the individual bands or groups of bands can be applied via a scale factor, or via a filter, again operating on the time domain signals. For clarity, calculations are made in one or more embodiments to determine an ESR. Embodiments consistent with aspects of the present innovation can equivalently calculate an inversely related speech-to-echo ratio (SER) to the same effect. Finally, the processed signal can be re-combined using a synthesis filter-bank.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:

performing, by a processor, dual channel echo cancellation comprising:

receiving a first reference signal from a first channel associated with an audio playback component of an electronic device configured for audio signal processing and playback;

receiving an echo signal from a second channel associated with a microphone component of the electronic device;

adaptively filtering the first reference signal;

subtracting the adaptively filtered first reference signal from the echo signal to create an error signal;

calculating adaptive filter weights for the adaptive filtering of the error signal; and recursively biasing the adaptive filtering with adaptive filtering weights calculated as a result of a least mean squares filtered error signal; and performing, by the processor, dual channel echo suppression of the adaptively filtered first reference signal comprising:

detecting spectral energy in the adaptively filtered first reference signal and the error signal;

calculating echo-to-speech ratio (ESR) of the spectral energy; and adjusting spectral gain of the error signal based on the ESR to generate a first output signal.

2. The method of claim 1, further comprising:

receiving more than one reference signal; and combining the more than one reference signals to generate the first reference signal.

3. The method of claim 1, further comprising:

receiving a second reference signal;

performing dual channel echo cancellation on the second reference signal and the first output signal to generate a second error signal;

modulating the first error signal by a first gain;

modulating the second error signal by a second gain;

combining the modulated first and modulated second error signals to produce the adaptively filtered reference signal; and performing the dual channel echo suppression of the adaptively filtered reference signal based on the second error signal.

4. The method of claim 1, further comprising:

selecting a gain level for a variable gain stage;

modulating the adaptively filtered reference signal according to a selected gain level in the variable gain stage; and performing the dual channel echo suppression on the modulated adaptively filtered reference signal.

5. The method of claim 1, further comprising:

detecting voice activity based on the reference signal; and performing the dual channel echo suppression in response to detecting the voice activity.

6. The method of claim 1, wherein calculating the adaptive filtering weights comprises using a least mean squares algorithm.

7. The method of claim 1, further comprising performing, by the processor, dual channel echo cancellation and suppression for each audio playback component of more than one audio playback component of the electronic device.

8. A portable device comprising:

an audio playback subsystem comprising a first speaker;

a first microphone;

an echo cancellation and echo suppression system communicatively coupled to the audio playback subsystem and the first microphone and comprising:

a dual channel echo cancellation stage comprising:

an adaptive filter that receives a first reference signal from a first channel based on an audio playback component of a portable device and that receives an echo signal from a second channel based on a microphone signal of the portable device and which generates an adaptively filtered first reference signal;

a least mean squares filter that calculates adaptive filter weights for the adaptive filter;

a subtraction component that subtracts the adaptively filtered first reference signal from the first microphone from an echo signal to create an error signal; and a dual channel echo suppression stage that receives the adaptively filtered first reference signal and the error signal and that:

detects spectral energy in the adaptively filtered first reference signal and in the error signal;

calculates echo-to-speech ratio (ESR) of the spectral energy; and adjusts spectral gain of the error signal based on the ESR to generate a first output signal.

9. The portable device of claim 8, further comprising a voice recognition engine that detects speech contained in the first output signal.

10. The portable device of claim 8, further comprising a communication transmitter that transmits the first output signal.

11. A computer program product comprising:

a computer-readable storage device having stored thereon program code that, when executed, configures a device having a processor to perform executable operations comprising:

performing dual channel echo cancellation comprising:

receiving a first reference signal from a first channel from an audio playback component of a portable device;

receiving an echo signal from a second channel from a microphone component of the portable device;

adaptively filtering the first reference signal;

subtracting the adaptively filtered first reference signal from the echo signal to create an error signal;

calculating adaptive filtering weights for the adaptive filtering using the error signal; and recursively biasing the adaptive filtering with the adaptive filtering weights calculated as a result of a least mean squares filtered error signal; and performing dual channel echo suppression of the adaptively filtered first reference signal comprising:

detecting spectral energy in the adaptively filtered first reference signal and the error signal;

calculating echo-to-speech ratio (ESR) of the spectral energy; and adjusting spectral gain of the error signal based on the ESR to output a first output signal.

* * * * *